United States Patent [19]

Schweickardt

[11] 4,400,754

[45] Aug. 23, 1983

[54] SPARK ARRESTOR

[75] Inventor: Karl Schweickardt, Cazenovia, N.Y.

[73] Assignee: Esquire, Inc., New York, N.Y.

[21] Appl. No.: 325,563

[22] Filed: Nov. 27, 1981

[51] Int. Cl.[3] .......................... H02H 7/04; H02H 9/04

[52] U.S. Cl. ........................................ 361/38; 361/129; 361/118; 361/56; 361/40; 313/309; 313/325; 315/86; 315/119; 328/10; 328/259

[58] Field of Search .................... 361/129, 18, 117, 56, 361/91, 111, 35, 38-40; 313/309, 306, 307, 325, 311, 312, 283, 284, 256, 231.1, 217, 216; 314/15; 315/3, 47, 74, 75, 119, 127, 86; 328/7-10, 259

[56] References Cited

U.S. PATENT DOCUMENTS

| | | | |
|---|---|---|---|
| 2,297,323 | 9/1942 | Rees et al. | 313/309 X |
| 3,109,118 | 10/1963 | Spacil et al. | 313/325 X |
| 3,292,049 | 12/1966 | Lucas, Jr. | 313/325 X |
| 3,359,523 | 12/1967 | Lou | 315/119 X |
| 3,840,774 | 10/1974 | Iwata | 328/259 X |
| 4,101,806 | 7/1978 | Alley | 361/38 X |
| 4,105,929 | 8/1978 | Cosco | 328/10 X |
| 4,178,617 | 12/1979 | Reichel | 361/111 X |

FOREIGN PATENT DOCUMENTS

| | | | |
|---|---|---|---|
| 7312 | of 1905 | United Kingdom | 361/117 |

*Primary Examiner*—Patrick R. Salce

*Attorney, Agent, or Firm*—Vaden, Eickenroht, Thompson, Bednar, & Jamison

[57] ABSTRACT

A spark arrestor for protecting a high intensity, gaseous discharge lamp, ballast and other circuit components against being damaged or destroyed by a large build up of voltage. The arrestor includes a multi-sided low dielectric disc with star-like conductive material on each side, the points of the star being opposite the mid-points of the sides. Terminals for connecting the spark arrestor across the secondary of the ballast, or other similar location, are connected to each of the star-like conductive materials. There is a non-conductive tubular shield around the disc to protect againt spreading of the spark, but the terminals extend from the ends of the shield for connection purposes.

8 Claims, 4 Drawing Figures

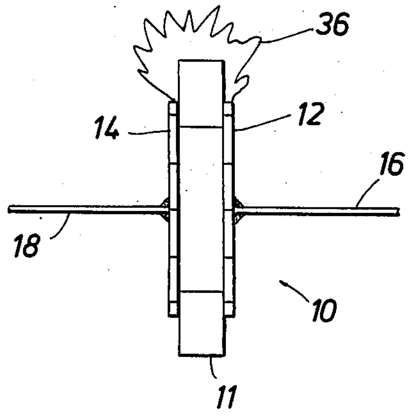
FIG. 1
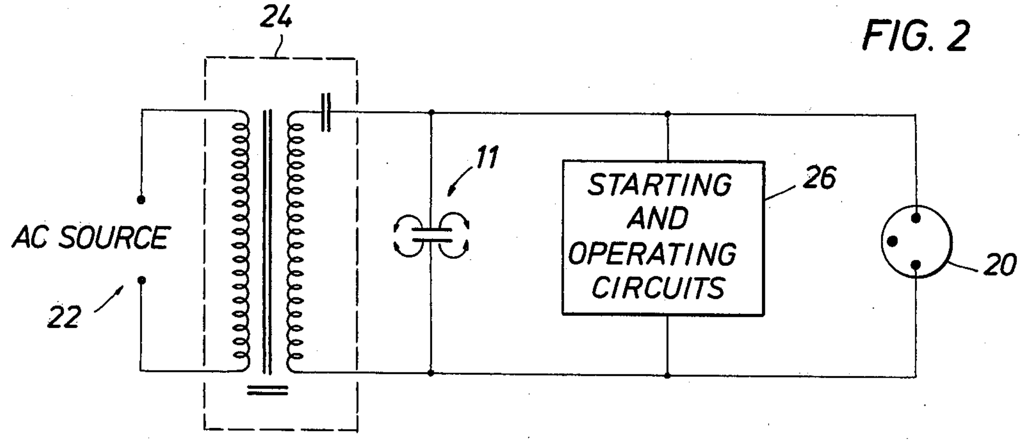
FIG. 2
FIG. 3
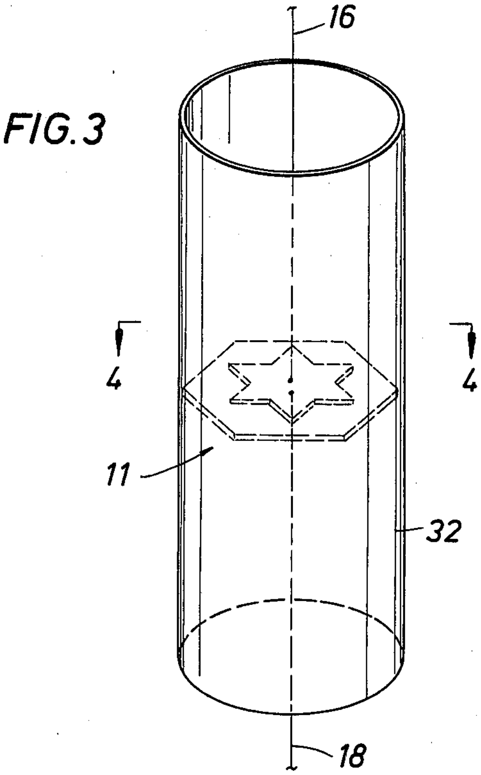
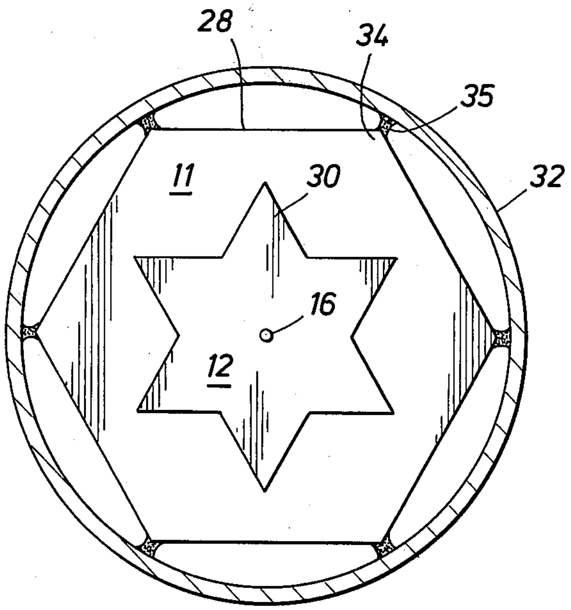
FIG. 4

SPARK ARRESTOR

BACKGROUND OF THE INVENTION

1. Field of the Invention

This invention relates to electrical protection devices and more particularly to a device operable with the ballast of a high intensity, gaseous discharge lamp or lamps, wherein such device does not insert an electrical characteristic to the circuit and does not have to be reset or replaced once the protection against a large electrical charge has occurred.

2. Description of the Prior Art

A high intensity, gaseous discharge lamp operates in conjunction with a ballast circuit for starting and maintaining operation of the lamp. The characteristics of the lamp and the starting and operating circuit are such that it is not uncommon that a very rapid change of current and/or voltage occurs. When this happens, there is sometimes a tremendously high charge developed across the ballast, which usually includes some sort of a transformer arrangement. For exemplary purposes only, it can be visualized that this large charge develops across the secondary of a transformer.

In addition to the normal high voltages or charges that exist in an HID lamp circuit, which may very normally include quite high starting pulses, extraordinary surges may occur due to lamp failure or other component failure, high voltages caused by mistakes in connecting the circuit components and the like. Such surges can result in exceedingly high voltage and/or current change rate, or di/dt, problems in the circuit.

A large voltage across the secondary of the ballast transformer can damage or even destroy the ballast and/or other components in the circuit. When this happens, it is sometimes difficult to detect what has been damaged or destroyed. Further, the location is often difficult to get to, such as at the top of a long pole, in order to replace a burned out ballast. Fuses and circuit breakers, which have to be replaced or reset, although saving the circuit components, do not make it any easier to attend from a maintenance point of view. It is possible, although not done in practice, to use existing spark arrestors that are employed in other applications. However, such known arrestors would add capacitance to the circuit, thereby changing the characteristics of the circuit. In addition, known prior art arrestors carbonize in use, causing additional problems of inserting an electrical component, the value of which changes, thus creating the possibility of establishing a completed short that would cause substantial and permanent damage and require the replacement maintenance that is often difficult, as described above.

As a result of all of the above, most high intensity, gaseous discharge lamp installations today are not protected against the sudden changes of voltage or current described above, which changes not infrequently occur.

Therefore, it is a feature of the present invention to provide an improved electrical spark arrestor, particularly well-suited for protecting a high intensity, gaseous discharge lamp circuit.

It is another feature of the present invention to provide an improved electrical spark arrestor that inserts no electrical characteristics into the protected circuit and which does not need resetting or replacement, even after a number of discharges, and which further does not appreciably carbonize.

SUMMARY OF THE INVENTION

The preferred embodiment of the invention is a six-sided disc of alumina or other low dielectric material onto the opposite sides of which are affixed conductive materials. This material affixed on each side of the disc is preferably configured to be a six-pointed star, the points of the star being intermediate the respective sides of the disc. This means the star points are closer to the edges than the rest of the star. Terminal wires are respectively connected by soldering or otherwise to the conductive materials on the two sides for connecting into the lamp ballast circuit to be protected. A shield, which is conveniently a plastic tube, surrounds the disc, the junction joints between the sides of the disc being glued or otherwise affixed to the shield. The device, being connected normally to the secondary of a ballast transformer, will arc around the edge of the disc when there is an exceedingly large charge difference existing between the two terminals. When the charge is over, the circuit restores without need to reset or replace a component such as with a circuit breaker or fuse. The arrestor just described advantageously also inserts no capacitance into the circuit. There is no carbonization or other adverse effect to the arrestor after the potentially damaging charge has been discharged or removed.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a preferred embodiment of the invention and are therefore not to be considered limiting of its scope, for the invention may admit to other equally effective embodiments.

In the Drawings:

FIG. 1 is a side view of a preferred embodiment of a substrate disc with conductive material affixed thereto, together with terminal connections, in accordance with the present invention.

FIG. 2 is a simplified schematic diagram showing the terminal connections of the spark arrestor in accordance with the present invention connected into a typical high intensity lamp and ballast circuit.

FIG. 3 is an oblique view illustrating a preferred embodiment of the present invention.

FIG. 4 is a cross-sectional view taken at line 4—4 of FIG. 3.

DESCRIPTION OF THE PREFERRED EMBODIMENT

Now referring to the drawings and first to FIG. 1, a spark arrestor 10 including a substrate 11 is shown of low dielectric material. Alumina has found to be a preferred material for the purposes herein described; however, other equivalent substrate materials may be used. It is significant that, in an electrical connection, the material acts as if there were a completely open circuit, neither adding capacitance nor any other electrical component thereto. The substrate material is preferably approximately 0.030 inches thick.

As shown in FIG. 4, the substrate material is formed in the shape of a multiple-sided disc, preferably six sided, although the disc can be shaped into a greater or lesser number. In fact, a circular disc can be employed, but, as will be described later, there is an advantage to the multi-sided disc.

Affixed to either side of the disc is an electrical conductive material 12 and 14, such as silver or copper alloy. The conductive materials 12 and 14 are respectively connected to a terminal or lead 16 and 18. Typically, the terminal is connected to the conductive material by soldering.

As shown in FIG. 2, a typical high intensity, gaseous discharge lamp 20 is connected to the ac distribution source or line 22 via a ballast 24 and other starting and operating circuits 26. The ballast shown is a magnetically coupled transformer with an internal capacitance, but the ballast may take the form of an autotransformer or inductor coil or coils not in transformer connection or other configuration. The circuit shown is a simplified exemplary circuit and is not limiting of the possible electrical connections available for a circuit for starting and operating a high intensity, gaseous discharge lamp (i.e., mercury vapor, metal halide, sodium vapor or the like).

Substrate disc 11 is connected typically across the lamp side of the ballast. When there is a rapid change of current across the lamp, which may occur with lamp failure or for a number of other reasons, a charge builds up. If it is extremely large or excessive, there will be a discharge, as shown by the arrows drawn in FIG. 2. If the arrestor were not there, such a high charge might well damage the ballast, the lamp or other electrical components of the circuit. The arrestor does not insert capacitance into the circuit.

Further, it should be noted that starting circuits, especially for high pressure sodium lamps, routinely apply starting pulses to the lamp on the order of 200–300 volts for short durations of time. The arrestor just described will not arc over with the application of such pulses, but only with a charge build up in excess of such voltage and for a longer period of time.

Now referring to FIGS. 3 and 4, a practical embodiment as it appears in use is illustrated. First referring to FIG. 4, substrate disc 11 is shown to have six equal sides 28. Material 12 (and material 14 which is on the other side of the substrate disc and is substantially identical and precisely aligned) is also configured to be six-sided, preferably in a star-like or approximate star-like shape. Points 30 of the pattern are positioned to be respectively positioned opposite the mid-points of the sides. Therefore, a point is closer to the mid-point of the side than to any other part of the side and, further, the shortest path around the edge of the disc from material 12 to material 14 is from a star point to a star point. However, there are six possible paths of equally short length, one for each respective star point pair.

A tubular shield 32 of non-conductive material and having a slightly larger inside diameter than the perimeter diameter of the disc taken from a junction point 34 to the junction point thereopposite, encases the disc. Each junction point 34 is glued at connections 35 or otherwise secured to the inside surface of the tubular shield, as shown in FIG. 4, leaving an open gap opposite each side 28 between the disc and the shield. Terminals 16 and 18 extend from the ends of the tubular shield for connecting into the electrical circuit.

It can be seen that the discharge arc 36 will take the shortest path available to it, namely around the edge of disc 10 from a point 30 of material 12 to a corresponding point 30 of material 14, the arc going around the center or mid-point of a side 28.

It should be noted that the formula that applies to the voltage which exists is $E=(L)di/dt$; wherein E is the voltage across the arrestor, L is equal to the inductance of the circuit which is primarily in the ballast, and di/dt is equal to the rate of change of the current through the ballast. This latter value undergoes occasional operational aberrations that cause the kind of voltage overload conditions which potentially cause the harm that the spark arrestor described hereinabove is designed to protect against. It should also be noted that a charge is not usually sustained for a large period of time, since the line voltage polarity reverses twice each cycle. Hence, if there is no discharge across the arrestor, the charge is still otherwise dissipated.

Although a preferred embodiment has been shown and described, it will be understood that the invention is not limited thereto since many modifications may be made and will become apparent to those skilled in the art. For example, the conductive side materials 12 and 14 may be shaped in the form that is generally elongate, triangular, quadrangular or the like, or even having a single "point". The sides of the disc may be convex to provide even more arcing space than that of the illustrated embodiment.

What is claimed is:

1. A spark arrestor for protecting a ballast connected to a high intensity, gaseous discharge lamp, comprising
- a substrate disc of low dielectric material having substantially no capacitance,
- a first side electrical conductive material affixed to a first side of said substrate disc,
- a second side electrical conductive material affixed to a second side of said substrate disc,
  - said first side material and said second side material both being patterned on the substrate disc to include a plurality of points near the peripheral edge of said substrate, the points of the material on each side being respectively substantially aligned,
- a first electrical terminal affixed to said first side material, and
- a second electrical terminal affixed to said second side material,
  - said first terminal and said second terminal providing connection across the ballast,
  - a large electrical charge between said first terminal and said second terminal discharging around the peripheral edge of the substrate disc from at least one point of said first side material to the corresponding point of said second side material.

2. A spark arrestor in accordance with claim 1, wherein said substrate disc is alumina.

3. A spark arrestor in accordance with claim 2, wherein said substrate disc is about 0.030 of an inch.

4. A spark arrestor in accordance with claim 1, wherein said first side material and said second side material are patterned to include six points.

5. A spark arrestor in accordance with claim 4, wherein said substrate includes six consecutively joined peripheral sides, the points of said first side material and said second side material being respectively intermediate the junctions of said six sides.

6. A spark arrestor in accordance with claim 1, and including a shield around said substrate disc, said first side material and said second side material, said first terminal and said second terminal extending therefrom.

7. A spark arrestor in accordance with claim 6, wherein said substrate includes six consecutively joined peripheral sides, the points of said first side material and said second side material being respectively intermediate the junctions of said six sides, and said shield is annular and in contact with at least two of the junctions of said six sides.

8. A spark arrestor in accordance with claim 7, and including junction securing means at each of the junctions where said substrate disc contacts the shield.

* * * * *